(12) United States Patent
Harris

(10) Patent No.: US 7,641,040 B2
(45) Date of Patent: Jan. 5, 2010

(54) TEXTILE SEPARATING APPARATUS

(76) Inventor: David W. Harris, 15541 NE. Eilers Rd., Aurora, OR (US) 97002

( * ) Notice: Subject to any disclaimer, the term of this patent is extended or adjusted under 35 U.S.C. 154(b) by 0 days.

(21) Appl. No.: 12/004,318

(22) Filed: Dec. 19, 2007

(65) Prior Publication Data

US 2008/0149460 A1    Jun. 26, 2008

Related U.S. Application Data

(60) Provisional application No. 60/876,925, filed on Dec. 21, 2006.

(51) Int. Cl.
*B65G 47/14* (2006.01)
(52) U.S. Cl. .................. 198/396; 198/397.01; 414/13
(58) Field of Classification Search ............. 198/396, 198/397.01, 443, 444; 414/13; 38/8, 9; 209/937
See application file for complete search history.

(56) References Cited

U.S. PATENT DOCUMENTS

| | | | | |
|---|---|---|---|---|
| 2,954,862 | A | * 10/1960 | Clark | 198/443 |
| 4,917,562 | A | * 4/1990 | Colli et al. | 414/420 |
| 4,943,198 | A | * 7/1990 | McCabe | 414/13 |
| 5,586,637 | A | * 12/1996 | Aidlin et al. | 198/396 |
| 5,617,804 | A | 4/1997 | Savio | |
| 5,810,149 | A | 9/1998 | Sandberg et al. | |
| 5,988,356 | A | 11/1999 | Bonnet | |
| 6,089,810 | A | 7/2000 | Heinz et al. | |
| 6,116,849 | A | * 9/2000 | Fesmire et al. | 414/13 |
| 7,284,667 | B2 | 10/2007 | Weir | |

\* cited by examiner

*Primary Examiner*—James R Bidwell
(74) *Attorney, Agent, or Firm*—Kolisch Hartwell, P.C.

(57) ABSTRACT

A textile separating apparatus may include a textile collection area for supporting the pile of textile items, and a transport mechanism having an inclined face intersecting the pile of textile items. One or more pick members may project from the face of the transport mechanism, and may successively separate and carry individual textile items from the pile of textile items towards a textile receiving area.

20 Claims, 2 Drawing Sheets

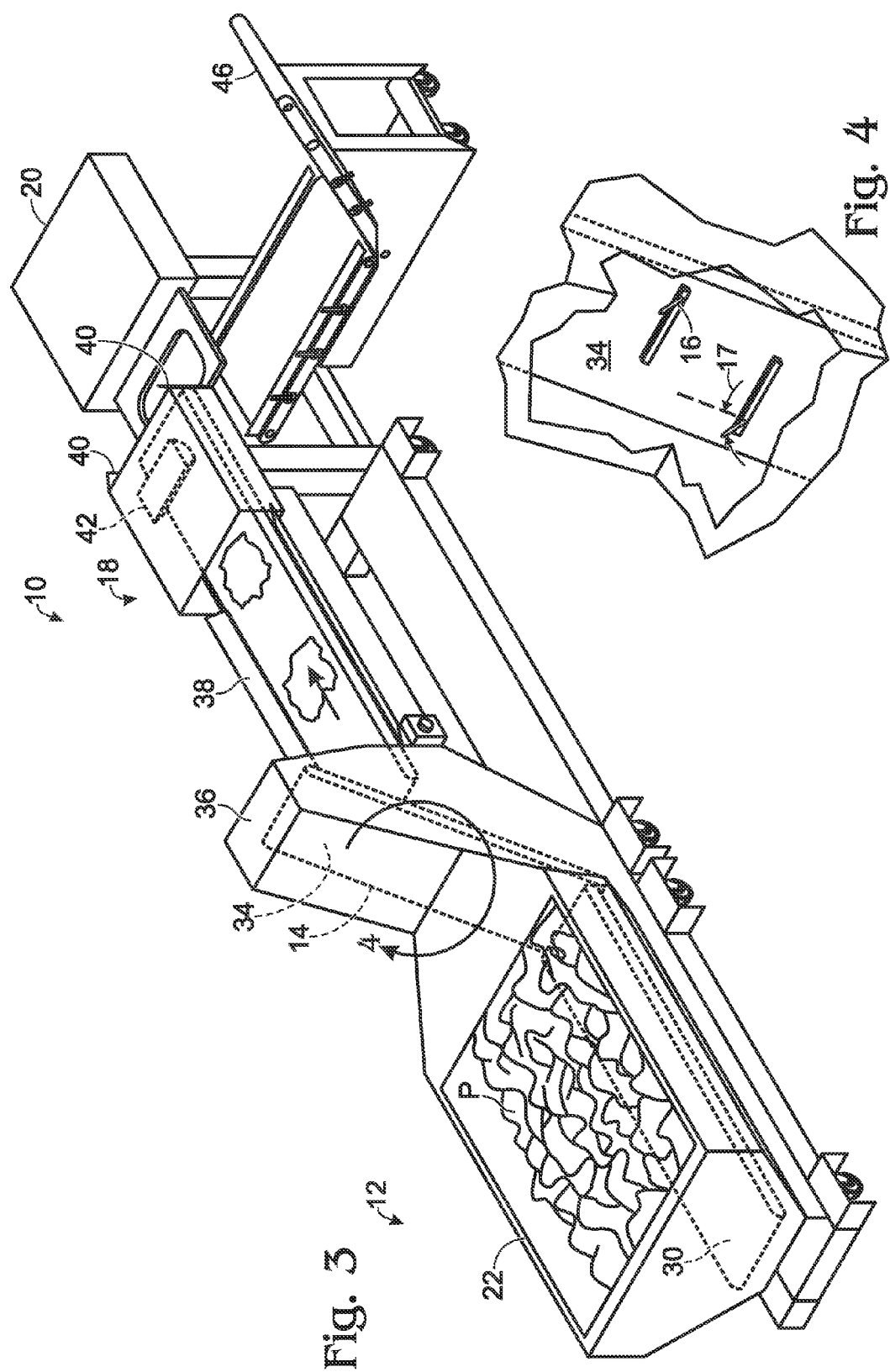

TEXTILE SEPARATING APPARATUS

CROSS REFERENCE TO RELATED APPLICATION

This application claims priority from U.S. Provisional Patent Application Ser. No. 60/876,925 of David William Harris for TEXTILE PACKAGING SYSTEM, filed Dec. 21, 2006, the disclosure of which is hereby incorporated by reference.

TECHNICAL FIELD

The present disclosure relates generally to a textile separating apparatus, and more specifically, to a textile separating apparatus for the separation of individual textile items from a pile of textile items, thereby aiding in inspection, sorting, and/or assembly of the textiles into groups or packages.

BACKGROUND

Generally, management of textiles requires separation of individual textile items from a pile or heap of textile items so that each textile item may be inspected, counted, and/or distributed into appropriate groups or packages. Each package or group may be desired to have a predetermined number and/or quality of textile items. The current methods used to separate textile items, such as selection and inspection by hand, are operator dependant, thus rates of production are widely variable, and require constant repetitive motions by the operator to process the textile items. Additionally, more than one operator is often needed. Typically, separation and distribution of the textile items by hand is an accurate, but time consuming and labor intensive process that requires each individual textile item, from a pile of textile items of undetermined number and quality, be manually selected and separated from the pile for inspection and counting.

BRIEF DESCRIPTION OF THE DRAWINGS

FIG. 3 is a perspective view of a textile separating apparatus in accordance with the present disclosure, showing an exemplary transport mechanism.

FIG. 4 is a detailed view of a segment of the transport mechanism in FIG. 3, illustrating pick members projecting from an inclined face of the transport mechanism in accordance with the present disclosure.

DETAILED DESCRIPTION

In view of the foregoing disadvantages inherent in the existing methods of manual separation of textile items for inspection, counting, and/or packaging, the present disclosure provides a new strategy in textile separation. Namely, the present disclosure describes a textile separating apparatus for the successive selection of a number of individual textile items from a pile of textile items, thereby aiding in inspection, sorting, and/or packaging in groups of a predetermined number and/or quality.

The present textile separating apparatus, which will be described subsequently in greater detail, employs a new technology in regards to the textile industry. Some embodiments of a textile separating apparatus may generally include a textile collection area for supporting a pile of textile items, and a textile receiving area. A transport mechanism having an inclined face may span the distance between the textile collection area and the textile receiving area, and may further intersect the pile of textile items. A pick member projecting from the face of the transport mechanism may separate and carry a textile item towards the textile receiving area.

Some embodiments of a textile separating apparatus may include a looped transport mechanism intersecting a pile of textile items supported by the textile collection area. Further, in some embodiments, a pick member projecting from the transport mechanism may move in a continuous circuit to successively separate, and carry away individual textile items to a textile receiving area.

In some embodiments, the textile collection area may further include an advancement mechanism for the movement of textile items towards the transport mechanism at a controlled rate. The rate may be adjustable to insure that the rate of travel is timed to supply an appropriate quantity of textile items to the transport mechanism.

The textile receiving area may further include mechanism for further processing the separated textile items, such as an inspection station moving at a controlled rate away from the transport mechanism, a photoelectric eye to count textile items, a gate programmed to alternatively allow or impede the progression of the textile items, and/or an automated bagging system.

As described herein, a textile separating apparatus 10 may be configured in accordance with the present disclosure to separate, and carry away, individual textile items from a pile of textile items. The separated textile items may then be further processed as desired into packages of textiles of a predetermined number, and/or quality. For example, the separated textile items may be inspected for quality purposes, counted, and/or bagged. For clarity, textile separating apparatus 10 is illustrated without textile items in FIGS. 1 and 2, and with textile items in FIG. 3.

Figure 1:
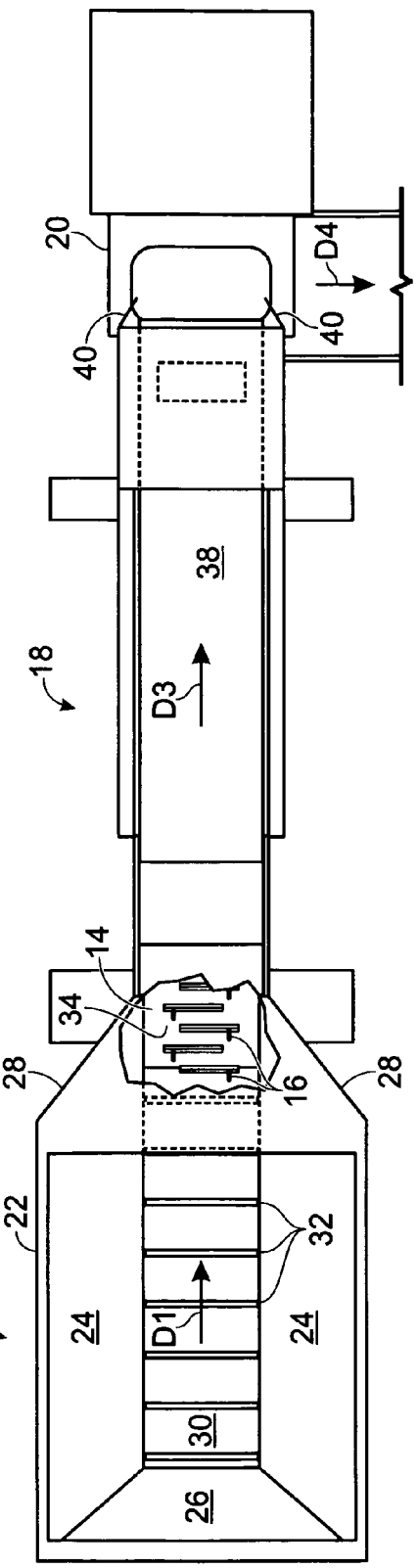
FIG. 1 is a plan view of a textile separating apparatus in accordance with the present disclosure, showing a textile collection area, a transport mechanism, and a textile receiving area, including an inspection station and an automated bagging system.
Figure 2:
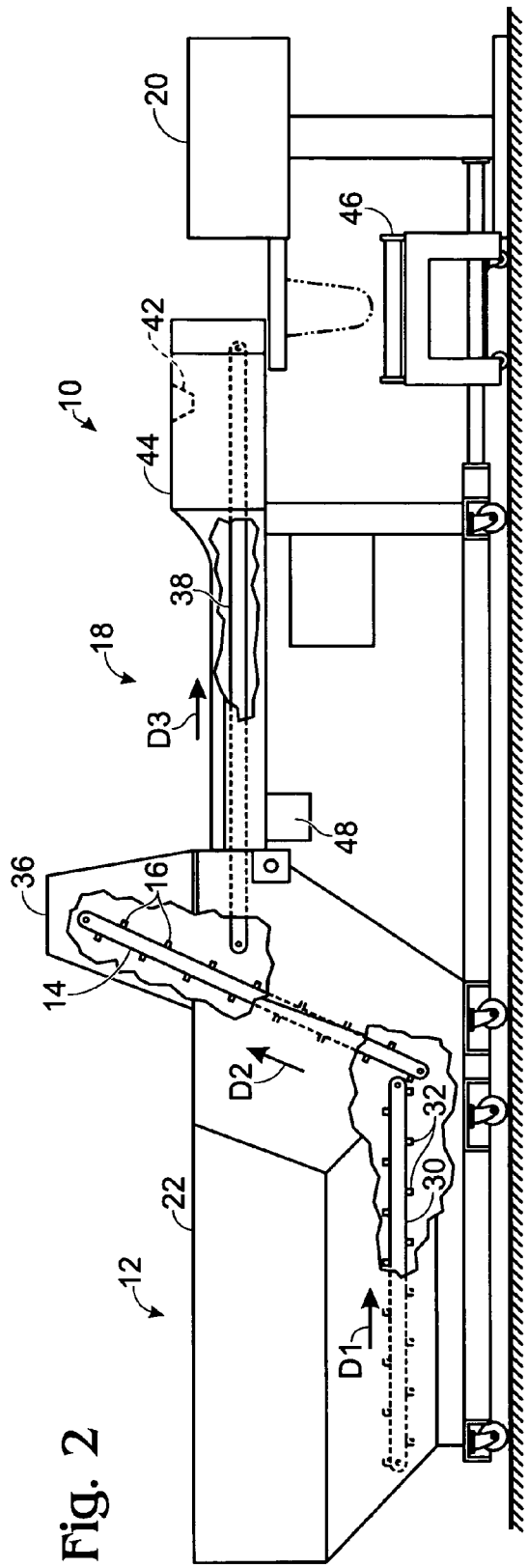
FIG. 2 is a side view of a textile separating apparatus in accordance with the present disclosure, showing an exemplary transport mechanism.

As shown in FIGS. 1-3, textile separating apparatus 10 may include a textile collection area 12 supporting plural textile items such as those shown in pile P, and a powered transport mechanism 14 intersecting the pile of textile items P. In accordance with the present disclosure, a pick member 16, projecting from a face 34 of transport mechanism 14, may separate and carry away a textile item up an incline from the pile of textile items P towards a textile receiving area 18.

In some embodiments, textile separating apparatus 10 may further include mechanism for processing of separated textile items at textile receiving area 18. For example, textile receiving area 18 may include an inspection station 38 to receive and convey the separated textile items from transport mechanism 14, and/or an automated bagging system 20 for packaging the separated textile items.

Textile collection area 12 may include structure to contain the pile of textile items P. In some examples of textile separating apparatus 10, textile collection area 12 may include a bin 22. As shown in FIGS. 1-3, bin 22 may include side walls 24, a rear wall 26 distal with respect to transport mechanism 14, and a front wall 28 adjacent transport mechanism 14. Bin 22 may be characterized by angles and dimensions suitable for containing the pile of textile items P, and, further, may be shaped and/or configured to direct the pile of textiles items P towards transport mechanism 14. For example, part or all of side walls 24 may be inwardly sloping towards the bottom of bin 22. Further, as best seen in FIG. 2, front wall 28 may be angled towards transport mechanism 14 to aid in intersection of transport mechanism 14 with the pile of textiles P. The size and shape of bin 22 may further depend on the size and shape of the pile of textile items P to be separated.

In some embodiments, textile collection area 14 may include a powered advancement mechanism 30 to direct, compel, advance, or otherwise move the pile of textile items P towards transport mechanism 14, such that transport mechanism 14 may continuously intersect with the pile of textile items P. Examples of advancement mechanism 30 may include a belt conveyor, a pushing device, a lifting device, a vibration device and/or other known movement means.

Textile collection area 12 may include an advancement mechanism 30 to move the supported pile of textile items P towards transport mechanism 14, as illustrated by directional arrow D1. Advancement mechanism 30 may span all, or part of, the length of textile collection area 12. As illustrated in FIGS. 1 and 2, advancement mechanism 30 may include raised members 32 for increased frictional movement of the pile of textile items P towards transport mechanism 14. A plurality of textile items of undetermined quantity and/or quality may thereby enter textile collection area 12 for continuous movement by advancement mechanism 30 towards transport mechanism 14.

As discussed above, transport mechanism 14, in accordance with the present disclosure, may define an inclined face 34 that intersects the pile of textile items P. For example, as best illustrated in FIGS. 2 and 3, textile collection area 12 may lie generally in the plane of the floor, whereas transport mechanism 14 may operate at an incline of 100-120 degrees relative to textile collection area 12. Transport mechanism 14 thus may be inclined such that a separated textile item may be partially supported by transport mechanism 14 as it travels away from the pile of textile items P, as illustrated by directional arrow D2.

Transport mechanism 14 may extend between textile collection area 12 and textile receiving area 18. In some embodiments, transport mechanism 14 may span the entire distance between textile collection area 12 and textile receiving area 18, thereby providing for delivery of individual textile items from textile collection area 12 to textile receiving area 18. As best illustrated in FIGS. 2 and 3, one or more guidewalls 36 may line the sides of transport mechanism 14 to ensure that separated textile items do not fall off the sides of transport mechanism 14. Referring still to FIG. 2, it will be appreciated that transport mechanism 14 may form a loop, such that pick member 16 travels in a continuous circuit that intersects with the pile of textile items P to catch hold of a textile item from the pile of textile items P, deliver the textile item up an incline and over a precipice to textile receiving area 18, and then return to textile collection area 12 to catch hold of another textile item.

As illustrated in FIG. 4, pick member 16 may project from face 34 of transport mechanism 14. In some examples, pick member 16 may be approximately ½-inch long, and may project from face 34 at an approximate 110-degree upward angle. In other words, pick member 16 may project from face 34 at an approximate 70 degree acute angle 17 with respect to face 34. In other examples, pick member 16 may take the form of a metal hook. In still other examples, pick member 16 may take another shape adapted to catch, hold, and pull a textile item from a pile, and may be angled depending on the type of textile item to be separated. The size of pick member 16 may also depend on the size and/or weight of the textile item to be separated.

As illustrated in FIG. 4, one or more pick members 16 may project from transport mechanism 14, and may be uniformly or variably spaced along the length or a partial length of transport mechanism 14. For example, one of more pick members 16 may be spaced from 3-inches to 24-inches apart along a length of transport mechanism 14. In the examples shown in FIGS. 1 and 4, one or more pick members 16 are mounted adjacent opposite side edges of face 34 of transport mechanism 14 in an alternating pattern. The alternating pattern may allow a greater number of pick members 16 to project from transport mechanism 14. The locations of pick members 16 also may depend on the size of the items selected.

In some embodiments, it may be possible to move the pick members along a stationary surface, thereby providing for movement of textile items along the incline. In these embodiments, pick member 16 may project openings in the stationary surface. In other embodiments, pick member 16 may be coupled or mounted to face 34 such that pick member 16 moves with face 34.

As explained above, in some examples it may be desirable to further process textile items after textile items have been separated, and carried away from the pile of textile items P. Further processing may include processing within textile receiving area 18, located in a textile receiving relationship with respect to transport mechanism 14. As best shown in the example in FIG. 2, transport mechanism 14 may project over textile receiving area 18. In some examples, a textile item separated by pick member 16 may travel over a precipice of transport mechanism 14, and may drop onto textile receiving area 18.

Textile receiving area 18 may include an inspection station employing a powered conveyer 38 for conveyance of separated textile pieces away from transport mechanism 14, as illustrated by directional arrow D3. The rate of conveyance through the inspection station may depend on the time needed for inspection, sorting, and/or collection of the textile items. A human operator may inspect the separated textile items or, alternatively, textile receiving area 18 may include an optical inspection machine or scanner. Alternative examples of textile receiving area 18 may include other known mechanisms for spaced movement of textile items. Textile receiving area 18 may further include a gate 40, illustrated in FIG. 1, to selectively impede movement of the textile items.

As shown in FIGS. 1-3, in some examples, textile separating apparatus 10 may include automated bagging system 20 to provide automatic bagging and sealing of the separated textile items. For example, textile separating apparatus 10 may include a Max™ Bagging Machine, manufactured by Sharp Packaging Systems of Sussex, Wis. Other exemplary automated bagging systems include the Titan 6500 Semi-automatic Packaging Machine manufactured by James Dawson Enterprises, Ltd. of Plattsburg, N.Y.; the T1000 Advance Poly-Bagger manufactured by Advanced Poly Packaging of Akron, Ohio; or the Autobagger manufactured by Automated Packaging Systems of Streetsboro, Ohio. Each of these systems is capable of bagging and sealing up to 60 bags per minute. As shown in FIGS. 1-3, automated bagging system 20 may include an exit conveyer 46 for conveying filled bags away from the area surrounding automated bagging system 20, as illustrated by directional arrow D4.

Inspection station 38 may further include a photoelectric eye 42. Photoelectric eye 42 may count the textile items at inspection station 38, for example, as they pass on a belt conveyor. Photoelectric eye 42 may be mounted approximately 10-inches from the distal end of inspection station 38. Photoelectric eye 42 may be protected by a photoelectric eye cover 44. In some examples of textile separating apparatus 10, photoelectric eye 42 may be operationally interconnected with gate 40 and/or automated bagging system 20.

An exemplary method of separating textiles in accordance with the present disclosure and FIGS. 1-3 may proceed as follows. A number of textile items may be loaded in to textile collection area 12, all at once, or in intermittent loads. Advancement mechanism 30 may advance the resulting pile of textile items P towards transport mechanism 14, so that the pile of textile items P and transport mechanism 14 intersect. Pick member 16, projecting from face 34 of transport mechanism 14, may separate individual textile items from the pile of textile items P, and carry the separated textile items towards textile receiving area 18.

Once separated, textile items may be released or dropped into textile receiving area 18. Pick member 16 may then return in a continuous loop to successively separate additional textile items from the pile of textile items P. Upon being dropped into textile receiving area 18, textile items may be conveyed in a spaced manner through the inspection station. Prior to the textile items leaving the inspection station, individual textile items may be sorted by human action or automatic mechanism, and/or counted by photoelectric eye 42.

In some embodiments, after a predetermined quantity of textiles (set by automated bagging system 20) are counted, photoelectric eye 42 may send a signal to gate 40, directing gate 40 to close (typically after a time delay). While gate 40 is closed, automated bagging system 20 may cycle, reposition a new bag to collect the textile items coming off the end of belt conveyor 38, and then signal gate 40 to open so that textile items may begin to fill the next bag. The filled bag may then leave the area surrounding automated bagging system 20 via exit conveyor 46.

Some examples of a textile separating apparatus may include additional control features to further the accuracy and efficiency of the textile separating apparatus. As shown in FIG. 2, in the examples of a textile separating apparatus including advancement mechanism 30, advancement mechanism 30 may feed textiles towards transport mechanism 14 at a controlled rate and/or on an intermittent timed basis with the use of a repeat cycle timer 48, which provides for control of advancement mechanism 30. Rate of processing may therefore be independent of the speed of any individual operator, and productivity of the system may be readily determined.

The feed rate may be adjustable to ensure that the rate of travel is timed to supply an appropriate quantity of textile items to transport mechanism 14 based on the size of the textile items. If the rate of travel is too slow, there may be a gap in the textile items selected and fed through the process. If the rate is too high, the textile items may "bunch up" at transport mechanism 14 and cause double picks (meaning that pick member 16 may select more than one item at a time), thereby causing extra work for an inspector. Other operations and/or conveyors in the textile separating apparatus may also have rate adjustment ability. The present textile separating apparatus typically may be operated to process approximately 4,800 textile items per operator hour.

The components expressed so far descriptively, may be mounted on a framework that supports such components so that they are positioned for the maximum mechanical and operational advantage inherently possible between the components. Scaling of the individual components, and overall machine proportions, are variable and relative to the users operational specifications. As illustrated in FIGS. 1 and 3, some examples of textile separating apparatus 10 may be mounted on a wheeled framework for ease of movement, for example, around a warehouse.

With respect to the above description then, it is to be realized that the optimum dimensional relationships for the parts of the claimed method and apparatus for separating textiles, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

Therefore, the foregoing is considered as illustrative only of the principles of the system. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

What is claimed is:

1. A textile separating apparatus, comprising;
   a textile collection area for supporting plural textile items;
   a textile receiving area;
   a transport mechanism having an inclined face, wherein the transport mechanism extends between the textile collection area and the textile receiving area, the transport mechanism intersecting the plural textile items; and
   a pick member projecting from the face of the transport mechanism, wherein the pick member separates and carries a textile item from the plural textile items to the textile receiving area and the inclined face of the transport mechanism is inclined such that at least a portion of the separated textile item is partially supported on the inclined face of the transport mechanism.

2. The textile separating apparatus of claim 1, wherein the textile collection area includes a bin containing the plural textile items.

3. The textile separating apparatus of claim 1, wherein the textile collection area includes an advancement mechanism, wherein the advancement mechanism moves the plural textile items towards the transport mechanism.

4. The textile separating apparatus of claim 1, wherein the transport mechanism includes a looped conveyor intersecting the plural textile items.

5. The textile separating apparatus of claim 1, wherein the textile receiving area includes a belt conveyor in a textile receiving relationship with the transport mechanism.

6. The textile separating apparatus of claim 1, wherein the pick member projects from the face of the transport mechanism at an acute angle with respect to the face of the transport mechanism.

7. The textile separating apparatus of claim 1, further comprising more than one pick member evenly distributed along a length of the transport mechanism.

8. The textile separating apparatus of claim 1, wherein pick members alternately project from adjacent opposite sides of the transport mechanism.

9. The textile separating apparatus of claim 3, wherein the advancement mechanism includes raised members projecting from a face of the advancement mechanism.

10. The textile separating apparatus of claim 4, wherein the textile receiving area further includes a gate to selectively block advancement of textile items.

11. The textile separating apparatus of claim 1, further comprising a photoelectric eye, wherein the photoelectric eye counts the separated textile items.

12. The textile separating apparatus of claim 3, wherein the advancement mechanism controls the rate the plural textile items move toward the transport mechanism.

13. The textile separating apparatus of claim 1, further comprising an automated bagging system.

14. A method of separating textiles, comprising;
advancing a pile of textile items towards a transport mechanism having an inclined face;
successively separating individual textile items from the pile of textile items on a pick member projecting from the face of the transport mechanism; and
carrying the separated textile items to a textile receiving area, wherein carrying the separated textile items includes supporting at least a portion of the separated textile items on the inclined face of the transport mechanism.

15. The method of separating textiles of claim 14, further comprising releasing the separated textile items from the pick member at the textile receiving area.

16. The method of separating textiles of claim 14, further comprising counting the separated textile items at the textile receiving area.

17. The method of separating textiles of claim 14, further comprising bagging the separated textile items into packages at the textile receiving area, wherein each package includes a predetermined number of textile items.

18. The method of separating textiles of claim 14, further comprising inspecting the separated textile items for quality at the textile receiving area.

19. A textile separating apparatus, comprising;
a bin for containing a pile of textile items, the bin including an advancement mechanism;
a looped conveyor intersecting the pile of textile items; and
a pick member projecting from a face of the looped conveyor at an acute angle with respect to the face of the looped conveyor, wherein the advancement mechanism moves the pile of textile items towards the looped conveyor at a controlled rate, and, further wherein, the pick member separates a textile item from the pile of textile items and carries the separated textile item towards a textile receiving area.

20. The textile separating apparatus of claim 19, wherein the textile receiving area further includes an automated bagging system.

* * * * *